(12) United States Patent
Berteloot et al.

(10) Patent No.: US 9,840,623 B2
(45) Date of Patent: Dec. 12, 2017

(54) DETOXIFICATION METHOD FOR OBTAINING A ZINC CONTAINING PIGMENT COMPOUND WITH NO ECOTOXICITY

(75) Inventors: Christelle Berteloot, Somain (FR); Vincent Ernst, Villeneuve D'Ascq (FR); Ludovic Mavel, Hordain (FR)

(73) Assignee: Societe Nouvelle Des Couleurs Zinciques, Bouchain (FR)

( * ) Notice: Subject to any disclaimer, the term of this patent is extended or adjusted under 35 U.S.C. 154(b) by 0 days.

(21) Appl. No.: 13/202,462

(22) PCT Filed: Feb. 19, 2010

(86) PCT No.: PCT/EP2010/052118
§ 371 (c)(1),
(2), (4) Date: Aug. 19, 2011

(87) PCT Pub. No.: WO2010/094764
PCT Pub. Date: Aug. 26, 2010

(65) Prior Publication Data
US 2011/0300084 A1 Dec. 8, 2011

(30) Foreign Application Priority Data
Feb. 20, 2009 (FR) ...................... 09 51104

(51) Int. Cl.
*C04B 14/00* (2006.01)
*C09C 1/04* (2006.01)
(Continued)

(52) U.S. Cl.
CPC ............ *C09C 1/0081* (2013.01); *C09D 5/084* (2013.01); *C09D 11/03* (2013.01)

(58) Field of Classification Search
None
See application file for complete search history.

(56) References Cited

U.S. PATENT DOCUMENTS 3,533,859 A * 10/1970 Engesser et al. ............. 148/262
3,960,611 A 6/1976 Walker et al.
(Continued)

FOREIGN PATENT DOCUMENTS

DE 4014523 A1 11/1991
DE 19541895 A1 6/1996
(Continued)

OTHER PUBLICATIONS

JP Office Action for Japanese Patent Application No. 2011-550578.

*Primary Examiner* — Kaj K Olsen
*Assistant Examiner* — Ross J Christie
(74) *Attorney, Agent, or Firm* — Baker Hostetler LLP

(57) ABSTRACT

A detoxification method for obtaining a pigment compound free from acute and chronic aquatic ecotoxicity by mixing at least one zinc-based component with good anti-corrosive properties but high toxicity-with a phosphate or hydrogen phosphate of a magnesium, sodium, potassium, calcium, strontium, aluminum, ammonium, or organic type or any other compound based on such cations, such as carbonates, oxides, silicates, phosphites, pyrophosphates or phosphonates, said phosphates or hydrogen carbonates or carbonates or oxides or silicates or phosphites or pyrophosphates freed from toxicity enabling a very considerable reduction of the toxic power of said zinc-based component, while maintaining the good anti-corrosive properties thereof.

4 Claims, 2 Drawing Sheets

(51) Int. Cl.
  *C09C 1/00*   (2006.01)
  *C09D 5/08*   (2006.01)
  *C09D 11/03*  (2014.01)

(56) References Cited

U.S. PATENT DOCUMENTS

| | | | |
|---|---|---|---|
| 4,017,315 A | * | 4/1977 | Vukasovich et al. ...... 106/14.21 |
| 4,237,114 A | * | 12/1980 | Cardarelli ...................... 514/493 |
| 4,623,469 A | * | 11/1986 | Conner .......................... 106/608 |
| 5,037,479 A | * | 8/1991 | Stanforth ........................ 588/318 |
| 5,665,149 A | * | 9/1997 | Gotzmann et al. ......... 106/14.12 |
| 2004/0168614 A1 | * | 9/2004 | Pipko et al. ................... 106/499 |
| 2009/0238811 A1 | * | 9/2009 | McDaniel et al. ........... 424/94.2 |

FOREIGN PATENT DOCUMENTS

| | | | |
|---|---|---|---|
| EP | 0028290 A1 | | 5/1981 |
| EP | 1947154 A1 | * | 7/2008 |
| FR | 2254614 A1 | | 7/1975 |
| FR | 2295101 A1 | | 7/1976 |
| JP | 56-059873 A | | 4/1981 |
| JP | 2006116736 A | | 5/2006 |

\* cited by examiner

Photo 3 : PZ20    Photo 4 : PZAT90

DETOXIFICATION METHOD FOR OBTAINING A ZINC CONTAINING PIGMENT COMPOUND WITH NO ECOTOXICITY

CROSS-REFERENCE TO RELATED APPLICATIONS

This application is a National Stage of International patent application PCT/EP2010/052118, filed on Feb. 19, 2010, which claims priority to foreign French patent application No. FR 09 51104, filed on Feb. 20, 2009, the disclosures of which are incorporated by reference in their entirety.

FIELD OF THE INVENTION

Zinc containing pigment compounds are confronted with restrictions which are increasingly severe in terms of use in order to meet the various European environmental requirements and directives and notably in fields such as transport, storage and recycling.

BACKGROUND OF THE INVENTION

Over the past few years, many regulations have appeared, among which mention may be made of the following regulations:
WEEE—Waste Electrical and Electronic Equipment-2002
ROHS—Restriction of the use of certain Hazardous Substances-2002
End-of-Life Vehicle Recycling—ELV Recycling-2002
REACH—Registration, Evaluation and Authorization of Chemicals-2007
GHS—Globally Harmonized System of Classification and Labelling of Chemicals-2005.

Thus, by virtue of their ecotoxicity, the use of zinc containing pigment compounds has become more and more complex over the years.

This is notably the case of zinc phosphate and zinc oxide.

The classification of zinc salts, including notably zinc phosphate and zinc oxide, was thus established in 2004. Zinc phosphate is particularly mentioned in the $28^{th}$ A.T.P.—Adaptation to Technical Progress—of European directive 67/548/EEC. Zinc phosphate is labeled N/dangerous for the aquatic environment, and R50/53—"Very toxic to aquatic organisms, may cause long-term adverse effects in the aquatic environment".

Table 1 recapitulates, according to the amounts of zinc phosphate $Zn_3(PO_4)_2$, 2 to $4H_2O$ that are used in a product, the labeling restriction and also the associated working code risk phrases in accordance with directive 99/45/EC.

TABLE 1

Labeling and risk phrases for zinc phosphate use in a product according to 1999/45/EC.

| Quantity of $Zn_3(PO_4)_2$ | Labeling | Risk phrase |
|---|---|---|
| >25% | | R50/53 Very toxic to aquatic organisms, may cause long-term adverse effects in the aquatic environment |
| 2.5%-25% | | R51/53 Toxic to aquatic organisms, may cause long-term adverse effects in the aquatic environment |
| 0.25%-2.5% | None | R52/53 Harmful to aquatic organisms, may cause long-term adverse effects in the aquatic environment. |
| <0.25% | None | None |

Thus, any formulation which contains more than 2.5% by weight of this compound is consequently labeled N/Dangerous for the aquatic environment. A new need has thus emerged since certain markets do not accept this labeling and require pigment and compounds which do not lead to the N labeling.

In accordance with directive 99/45/EC, the formulator, in order to avoid the N labeling, is restricted to the use of less than 2.5% by weight of a product N, R50/53 such as zinc phosphate; however, in the case of anti-corrosion paints and coatings, resistance effectiveness increases with the zinc phosphate content.

It should be noted that, conventionally, according to European directive 1999/45/EC, the term "substances" defines chemical elements and their compounds in the natural state or as obtained by any method of production, including any additive necessary for preserving the stability of the product and any impurity deriving from the method, but with the exclusion of any solvent which can be separated without affecting the stability of the substance or modifying its composition.

It should also be noted that, conventionally, the term "preparations" defines mixtures or solutions composed of two substances or more.

In this context, Zinc free pigment and compounds used in anti-corrosion paints, which had been developed over the past few years, are of renewed interest. Patents have notably been filed on β-tricalcium phosphate (Budenheim, 1991, DE 4014523 A1), and on mixtures of β-tricalcium or dicalcium phosphate and trimagnesium phosphate (Budenheim, 1996-1997, DE 195 41 895 A1-U.S. Pat. No. 5,665,149A).

It has also been demonstrated that anti-corrosion pigments containing magnesium phosphate have an advantageous appeal in paint (Albright and Wilson, 1976, U.S. Pat. No. 3,960,611A), without however equaling zinc phosphate.

These zinc-free pigments are effective in certain paint systems but are not as universal as zinc phosphate. Indeed, zinc phosphate is effective in most of the formulations used in anti-corrosion paint.

SUMMARY OF THE INVENTION

In this context, the objective sought is to develop a detoxification method for obtaining a pigment compound free from acute and chronic aquatic ecotoxicity comprising at least one zinc-based component with good anti-corrosive properties but high toxicity, such as: powder of zinc metal, or zinc oxide or hydroxide, or phosphate, borate, stearate, laurate, carbonate, hydroxycarbonate, polyphosphate, phosphite, pyrophosphate, phosphonate, silicate or ferrite, characterized in that it comprises a mixture of said zinc-based component with at least one phosphate or hydrogenophosphate of the following type:
magnesium, which can be $MgHPO_4.3H_2O$ or $Mg_3(PO_4)_2.5H_2O$;

sodium, which can be $Na_3PO_4.10H_2O$ or $Na_3PO_4.12H_2O$ or $Na_2HPO_4.7H_2O$ or $Na_2HPO_4.12H_2O$;

potassium, which can be $K_3PO_4$ or $K_2HPO_4$;

calcium, which can be $CaHPO_4.2H_2O$ or $Ca_3(PO_4)_2$;

strontium, which can be $SrHPO_4$ or $Sr_3(PO_4)_2$;

aluminum $AlPO_4$;

ammonium, which can be $(NH_4)_3PO_4.3H_2O$ or $(NH_4)_2HPO_4$;

organic, which can be of guanidine type, or any other compound based on said cations Mg, Ca, Sr, etc, such as carbonates, oxides, silicates, phosphites, pyrophosphates or phosphonates, said phosphates or hydrogenocarbonates or carbonates or oxides or silicates or phosphites or pyrophosphates free from toxicity enabling to strongly decrease the toxic power of said zinc-based component, while maintaining the good anti-corrosive properties thereof.

According to one variant of the invention, said pigment component free from toxicity has an algae inhibition rate of less than 50% according to OECD protocol 201, a *daphnia* immobilization rate of less than 50% according to OECD protocol 202, a fish mortality rate of less than 50% according to OECD protocol 203, which results in LC50s (lethal concentration by ingestion for 50% of the population) and EC50s (lethal concentration by inhalation for 50% of the population) above 100 mg/l, and an NOEC (No Observed Effect Concentration) strictly above 1 mg/l on *daphnia* reproduction according to OECD protocol 211.

According to one variant of the invention, the mixing is carried out with zinc phosphate $Zn_3(PO_4)_2.0$ to $4H_2O$ and/or zinc oxide, and magnesium phosphate $MgHPO_4.3H_2O$, the weight ratio between the zinc salts and the magnesium phosphate being non-zero and included respectively between approximately 0 and 99.5%.

According to one variant of the invention, the weight ratio between the zinc phosphate and the magnesium phosphate is approximately 90%/10%, and the weight ratio between the zinc phosphate, the magnesium phosphate and the zinc oxide is approximately 80%/10%/10%.

The subject of the invention is also a method for producing an anti-corrosion paint, characterized in that it uses the pigment compound obtained by means of the detoxification method according to the invention.

According to one variant of the invention, the method for producing paint comprises the use of a pigment compound in combination with a non-ecotoxic filler, for instance talc, barite, kaolin, silica, aluminum silicates or carbonates, calcium silicates or carbonates, magnesium silicates or carbonates, potassium silicates or carbonates, iron oxide, chromium oxide green, mica, titanium dioxide, carbonate or ferrite, for producing a paint.

According to one variant of the invention, the detoxification method for obtaining a pigment compound comprises a mixing process via a physical or a chemical process, such as sequential precipitation, sequential crystallization, coprecipitation, cocrystallization, grinding, kneading, dispersion, extrusion, forming a slurry, or granulation.

The subject of the invention is also a method for obtaining a coating comprising a polymer of epoxy, alkyd, acrylic, vinyl, polyurethane, polyester, aminoplast, polyolefin, phenolic, butyral, butadiene, PVDF, rubber, or synthetic or natural oil type, characterized in that it uses the pigment compound obtained by means of the detoxification method of the invention.

A subject of the invention is also the use of an anti-corrosion coating obtained according to the method of the present invention, for treating a metal part or object such as a motor vehicle, ship, aircraft, bridge, civil engineering vehicle, rail vehicle, agricultural building, industrial building, coil coating, electronic, computer and household appliances materials, gas plant and oil plant.

A subject of the invention is also a method for obtaining a plastic, characterized in that it uses the pigment compound obtained by means of the detoxification method according to the invention.

A subject of the invention is also a method for obtaining a mastic, characterized in that it uses the pigment compound obtained by means of the detoxification method according to the invention.

A subject of the invention is also a method for obtaining an adhesive, characterized in that it uses the pigment compound obtained by means of the detoxification method according to the invention.

A subject of the invention is also a method for obtaining an ink, characterized in that it uses the pigment compound obtained by means of the detoxification method according to the invention.

A subject of the invention is also a method for obtaining a natural or synthetic rubber material, characterized in that it uses the pigment compound obtained by means of the detoxification method according to the invention.

A subject of the invention is also a method for obtaining a solid or liquid lubricant, characterized in that it uses the pigment compound obtained by means of the detoxification method according to the invention.

A subject of the invention is also a method for obtaining a fertilizing substance, characterized in that it uses the pigment compound obtained by means of the detoxification method according to the invention.

A subject of the invention is also a method for obtaining an anti-UV compound for plastics, characterized in that it uses the pigment compound obtained by means of the detoxification method according to the invention.

Finally, a subject of the invention is a method for obtaining an anti-UV compound for cosmetics, characterized in that it uses the pigment compound obtained by means of the detoxification method according to the invention.

A subject of the invention is also the use of an anti-corrosion coating according to the invention, for treating a metal part or object such as a motor vehicle, ship, aircraft, bridge, heavy construction machine, rail vehicle, agricultural building, industrial building, coil coating, electronic, computer and household appliance material, gas plant and oil plant.

BRIEF DESCRIPTION OF THE DRAWINGS

The invention will be understood more clearly and other advantages will become apparent on reading the description which follows and which is given without implied limitation, and by virtue of the appended figures among which.

Figure 1:
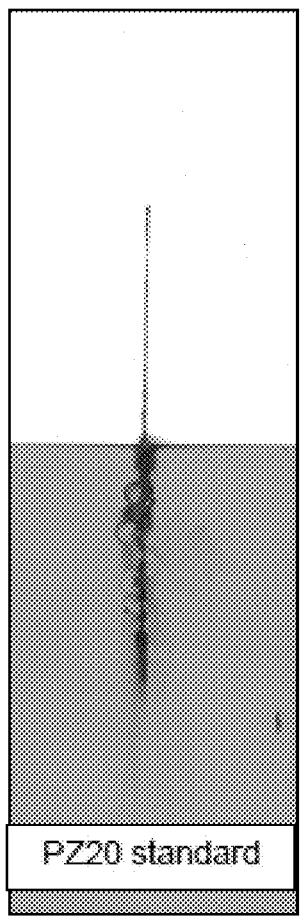
FIG. 1 illustrates paint tests for evaluating the anti-corrosion performance levels, carried out according to the ASTM 1654 standards for plate blistering and degree of rusting, of a coating comprising an anti-corrosion adhesion primer of a first type of epoxy amide incorporating a standard zinc phosphate, of a coating comprising an anti-corrosion adhesion primer of a first type of epoxy amide incorporating a first compound according to the invention, and of a coating comprising an anti-corrosion adhesion primer of a second type of epoxy amide incorporating a second compound according to the invention.
Figure 1:
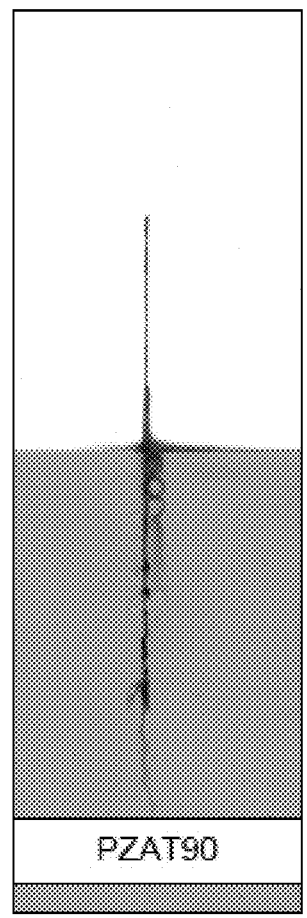

The rest of the description is more particularly presented in the context of magnesium monohydrogen phosphate, which is very suitable because it has very good compatibility with zinc phosphate.

DETAILED DESCRIPTION

Example of an Anti-Corrosion Compound Based on Zinc Phosphate, on Zinc Oxide and on Magnesium Phosphate The following compound was tested:

PZATB: 80% PZ/10% PAT30/10% ZnO with PZ: $Zn_3(PO_4)_2$.0 to $4H_2O$ and

PAT30: $MgHPO_4.3H_2O$

1) Ecotoxicity Tests on the Anti-Corrosion Compounds based on Zinc Phosphate, on Zinc Oxide and on Magnesium Phosphate There are two possible routes for determining the "dangerous for the environment" labeling of preparations:

- a first route governs the determination according to the substance mixture rule, i.e. according to the composition of the product. By this route, any product containing zinc is consequently dangerous for the environment;
- a second route governs the determination according to the ecotoxicity tests in accordance with OECD protocols 201, 202 and 203 for acute ecotoxicity on the preparation containing dangerous materials, this second possible route prevailing over the first route as defined in regulations 1999/45/EC and 1272/2008/EC reiterating the criteria for classification of a tested preparation or mixture containing at least one dangerous material.

According to the second route, the tests are carried out on the following three species: algae, *daphnia* and fish.

From a regulatory point of view, the applicant followed amended annex 5 of directive 67/548/EEC, directive 99/45/EEC relating to modified preparations, and the GHS report prepared in 2003—part 3, paragraph 3.10.3 relating to the criteria for the classification of mixtures, and tests were carried out according to the OECD guidelines 201 adopted on Mar. 23, 2006, 202 adopted on Apr. 13, 2004, and 203 adopted on Jul. 17, 1992.

The conventional labeling of a compound is subsequently carried out in relation to the poorest result of the three acute tests and makes it possible to provide the results recapitulated in table 2, in which the labelings possibly imposed are defined according to a concentration C, a test duration expressed in hours and a rate of 50 percent of species succumbing at the end of the number of hours identified.

TABLE 2

Labeling and risk phrases according to the results obtained in the ecotoxicity tests according to 1999/45/EC

| Tests | Concentration C | Labeling | Risk phrase |
|---|---|---|---|
| 96H LC50 (fish) 48H EC50 (*daphnia*) 72H LC50 (algae) | ≤1 mg/l | | R50/53 Very toxic to aquatic organisms, may cause long-term adverse effects in the aquatic environment |
| 96H LC50 (fish) 48H EC50 (*daphnia*) 72H LC50 (algae) | between 1 and 10 mg/l | | R51/53 Toxic to aquatic organisms, may cause long-term adverse effects in the aquatic environment |
| 96H LC50 (fish) 48H EC50 (*daphnia*) 72H LC50 (algae) | between 10 and 100 mg/l | None | R52/53 Harmful to aquatic organisms, may cause long-term adverse effects in the aquatic environment |
| 96H LC50 (fish) 48H EC50 (*daphnia*) 72H LC50 (algae) | >100 mg/l | None | R53 or no risk phrase according to the chronic ecotoxicity |

The globally harmonized labeling system GHS, in its latest revision of 2009, reiterates and confirms the maximum limits of 1 (category 1) 10 (category 2 [1 to 10 mg/l]) and 100 mg/l (category 3 [10 to 100 mg/l]) as criteria for classification of acute aquatic toxicity of categories 1 to 3. Above 100 mg/l for acute toxicity, the substance or the preparation is not classified for its toxicity.

In addition, the GHS also specifies that, when the chronic toxicity exhibits a no observed effect concentration of greater than 1 mg/l, then this substance or this mixture is not subject to classification for its chronic nature.

The tests were carried out at the CIT, Centre International de Toxicologie [International Center for Toxicology] in Evreux (France).

The preparation was produced by physical mixing.

The term GLP denotes tests carried out according to Good Laboratory Practice.

The following terms are used:

the reference LC50 denotes: the lethal concentration by ingestion for 50% of the population;

the reference EC50 denotes: the lethal concentration by inhalation for 50% of the population.

1.1. Acute ecotoxicity on *Pseudokirchneriella subcapitata* algae

TABLE 3

Results of acute ecotoxicity on *Pseudokirchneriella subcapitata* algae

| Preparation | GLP/non GLP test | Inhibition algae (%) | LC50 (mg/l) |
|---|---|---|---|
| PZATB | Non GLP | 36.2 | >100 |

Table 3 shows that the inhibition of the algae is less than 50%. The preparation is not therefore ecotoxic to the algae owing to an acute ecotoxicity LC50>100 mg/l according to OECD protocol 201.

1.2. Acute ecotoxicity on *Daphnia magna* crustaceans

TABLE 4

Results of acute ecotoxicity on *Daphnia magna* crustaceans

| Preparation | GLP/non GLP test | Immobilization *daphnia* (%) | EC50 (mg/l) |
|---|---|---|---|
| PZATB | Non GLP | 0 | >100 |

Table 4 shows that no *daphnia* is immobilized. The preparation is not therefore ecotoxic to crustaceans owing to an acute ecotoxicity EC50 >100 mg/l according to OECD protocol 202.

1.3. Acute ecotoxicity on *Oncorhynchus mykiss* fish

TABLE 5

Results of acute ecotoxicity on *Oncorhynchus mykiss* fish

| Preparation | GLP/non GLP test | Number of trout | Trout mortality (%) | LC50 (mg/l) |
|---|---|---|---|---|
| PZATB | Non GLP | 10 | 0 | >100 |

Table 5 shows that no trout died. The preparation does not exhibit any toxicity to the fish owing to an acute ecotoxicity LC50 >100 mg/l according to OECD protocol 203.

It thus emerges from these test that PZATB does not exhibit any acute toxicity.

Example of Anti-Corrosion Compounds Based on Zinc Phosphate and on Magnesium Phosphate Various compounds were produced and tested with weight ratios between zinc phosphate and magnesium monohydrogen phosphate ranging from 99%/1%) to 4.3%/95.7%, and identified as follows:

PZAT 99:PZ 99%/PAT30 1%
PZAT 95:PZ 95%/PAT30 5%
PZAT 90:PZ 90%/PAT30 10%
PZAT 80:PZ 80%/PAT30 20%
PZAT 70:PZ 70%/PAT30 30%
PZAT 60:PZ 60%/PAT30 40%
PZAT 50:PZ 50%/PAT30 50%
PZAT 40:PZ 40%/PAT30 60%
PZAT 04:PZ 4.3%/PAT30 95.7%
with PZ:$Zn_3(PO_4)_2$,0 to $4H_2O$ and
PAT30:$Mg\ HPO_4,3H_2O$ 2) Acute Ecotoxicity Tests on the Anti-Corrosion Compounds based on Zinc Phosphate and on Magnesium Phosphate Tests were carried out at the CIT, Centre International de Toxicologie [International Center for Toxicology] in Evreux (France).

The preparations were produced by physical mixing.

The term GLP denotes tests carried out according to Good Laboratory Practice.

The following terms are used:
the reference LC50 denotes: the lethal concentration by ingestion for 50% of the population;
the reference EC50 denotes: the lethal concentration by inhalation for 50% of the population.

2.1. Acute Ecotoxicity on *Pseudokirchneriella subcapitata* algae

TABLE 6

Results of acute ecotoxicity on *Pseudokirchneriella subcapitata* algae

| Preparation | GLP/non GLP test | Inhibition algae (%) | LC50 (mg/l) |
|---|---|---|---|
| PZ 99%/PAT30 1% | GLP | 16.29 | >100 |
| PZ 95%/PAT30 5% | GLP | 6.76 | >100 |
| PZ 90%/PAT30 10% | GLP | 11.67 | >100 |
| PZ 80%/PAT30 20% | Non GLP | 23.58 | >100 |
| PZ 70%/PAT30 30% | Non GLP | 19.16 | >100 |
| PZ 60%/PAT30 40% | Non GLP | 17.5 | >100 |
| PZ 50%/PAT30 50% | Non GLP | 13.72 | >100 |
| PZ 40%/PAT30 60% | Non GLP | 6.58 | >100 |
| PZ 4.3%/PAT30 95.7% | GLP | 12.24 | >100 |

Table 6 shows that the inhibition of the algae is less than 50%. The preparation is not therefore ecotoxic to the algae owing to an acute ecotoxicity LC50>100 mg/l according to OECD protocol 201.

2.2. Acute Ecotoxicity on *Daphnia magna* crustaceans

TABLE 7

Results of acute ecotoxicity on *Daphnia magna* crustaceans

| Preparation | GLP/non GLP test | Immobilization *daphnia* (%) | EC50 (mg/l) |
|---|---|---|---|
| PZ 99%/PAT30 1% | GLP | 0 | >100 |
| PZ 95%/PAT30 5% | GLP | 0 | >100 |
| PZ 90%/PAT30 10% | GLP | 0 | >100 |
| PZ 80%/PAT30 20% | Non GLP | 0 | >100 |
| PZ 70%/PAT30 30% | Non GLP | 0 | >100 |
| PZ 60%/PAT30 40% | Non GLP | 0 | >100 |
| PZ 50%/PAT30 50% | Non GLP | 0 | >100 |
| PZ 40%/PAT30 60% | Non GLP | 0 | >100 |
| PZ 4.3%/PAT30 95.7% | GLP | 0 | >100 |

Table 7 shows that no *daphnia* is immobilized. The preparation is not therefore ecotoxic to crustaceans owing to an acute ecotoxicity EC50 >100 mg/l according to OECD protocol 202.

2.3. Acute Ecotoxicity on *Oncorhynchus mykiss* fish

TABLE 8

Results of acute ecotoxicity on *Oncorhynchus mykiss* fish

| Preparation | GLP/non GLP test | Number of trout | Trout mortality (%) | LC50 (mg/l) |
|---|---|---|---|---|
| PZ 99%/PAT30 1% | GLP | 10 | 0 | >100 |
| PZ 95%/PAT30 5% | GLP | 10 | 0 | >100 |
| PZ 90%/PAT30 10% | GLP | 10 | 0 | >100 |
| PZ 80%/PAT30 20% | Non GLP | 10 | 0 | >100 |
| PZ 70%/PAT30 30% | Non GLP | 10 | 0 | >100 |
| PZ 60%/PAT30 40% | Non GLP | 10 | 0 | >100 |

TABLE 8-continued

Results of acute ecotoxicity on *Oncorhynchus mykiss* fish

| Preparation | GLP/non GLP test | Number of trout | Trout mortality (%) | LC50 (mg/l) |
|---|---|---|---|---|
| PZ 50%/PAT30 50% | Non GLP | 10 | 0 | >100 |
| PZ 40%/PAT30 60% | Non GLP | 10 | 0 | >100 |
| PZ 4.3%/PAT30 95.7% | GLP | 10 | 0 | >100 |

Table 8 shows that no trout died. The preparation does not exhibit any toxicity to the fish owing to an acute ecotoxicity LC50>100 mg/l according to OECD protocol 203.

Various compounds were produced and tested with weight ratios between zinc phosphate and magnesium monohydrogen phosphate ranging from 99%/1% to 25%/75%, and identified as follows:

PZAT 99:PZ 99%/PAT30 1%

PZAT 92:PZ 92%/PAT30 8%

PZAT 25:PZ 75%/PAT30 25% with PZ:$Zn_3(PO_4)_2$.0 to $4H_2O$ and

PAT30:$MgHPO_4.3H_2O$

3) Chronic Ecotoxicity Tests on the Anti-Corrosion Compounds based on Zinc Phosphate and on Magnesium Phosphate There are two possible routes for determining the "dangerous for the environment in the long term" labeling of preparations:

- a first route governs the determination according to the substance mixture rule, i.e. according to the composition of the product. Via this route, any product containing more than 25% of an R53 product (1999/45/EC) consequently exhibits a chronic ecotoxicity;
- a second route governs the determination according to ecotoxicity tests on the most sensitive species, which, in the case of zinc salts, is *daphnia*, in accordance with OECD protocol 211 relating to preparations containing dangerous materials, this possible second route prevailing over the first.

From a regulatory point of view, the applicant followed amended annex 5 of directive 67/548/EEC, directive 99/45/EEC relating to modified preparations in table 9, regulation 1272/2008 EC resulting from the recommendations of the UNO report of the GHS prepared in 2003 modified—part 3, paragraph 3.10.3 in table 10 relating to the criteria for the classification of mixtures, and tests were carried out according to the OECD guidelines 211 adopted on Oct. 3, 2008.

The term "NOEC" denotes the No Observed Effect Concentration.

TABLE 9

Chronic ecotoxicity labeling and risk phrases according to the GHS

| Tests | Labeling and risk phrases according to the GHS |
|---|---|
| If NOEC < or = 1 mg/l | May cause long-term adverse effects in the aquatic environment |
| If NOEC > 1 mg/l | No labeling<br>No risk phrase |

TABLE 10

Chronic ecotoxicity labeling and risk phrases according to regulation 1999/45/EC for preparations or mixtures

| Content | Labeling and risk phrases according to current regulations |
|---|---|
| If the content of R53 substance >25% (in the absence of R50 or 51 or 52) | R53<br>May cause long-term adverse effects in the aquatic environment |
| If the content of R53 substance <25% (in the absence of R50 or 51 or 52) | No labeling<br>No risk phrase |

Tests were carried out at the CIT, Centre International de Toxicologie [International Center for Toxicology] in Evreux (France).

The preparations were produced by physical mixing.

The tests were carried out under GLP. The term GLP denotes tests carried out according to Good Laboratory Practice.

TABLE 11

Results of the chronic ecotoxicity tests

| Preparation | Mortality | Growth | Reproduction | NOEC |
|---|---|---|---|---|
| PZAT99 | No effect | No effect | No effect | > or = 1.5 mg/l |
| PZAT92 | No effect | No effect | No effect | > or = 1.5 mg/l |
| PZAT25 | No effect | No effect | No effect | > or = 1.5 mg/l |

Table 11 shows that the preparations do not exhibit chronic ecotoxicity owing to an NOEC>1 mg/l according to OECD protocol 211.

None of the preparations containing zinc phosphate and magnesium phosphate have any dangerous for the environment labeling (no acute or chronic toxicity).

Since preparations containing 0 to 25% of zinc phosphate do not exhibit any chronic ecotoxicity according to the substance mixture rule, it was demonstrated that any compound containing from 0 to 99% of zinc phosphate as a mixture with magnesium phosphate is consequently exempt from dangerous for the environment labeling.

It thus emerges from these analyses that none of these preparations mentioned above in points 2 and 3 are dangerous for the environment, in terms of both acute and chronic characteristics.

The corresponding compounds listed above were evaluated in terms of toxicity and, by way of industrial illustration, are also evaluated in terms of anti-corrosion performance levels.

For this, conventional anti-corrosion adhesion primers of solvent-phase epoxy system type, incorporating the various pigment compounds, were prepared without there being any notable losses of performance levels compared with PZ.

Indeed, in the context of the problem of anti-corrosion coating, it is sought to develop anti-corrosion adhesion primers corresponding to the first coat intended to coat a metal surface, itself intended to support in a conventional manner a second coat of paint generally carrying the color of said coating and frequently called topcoat.

4) Anti-Corrosion Tests in Paint

Thus, the applicant carried out tests in paint proving the good anti-corrosion performance levels in paint of the compounds. These tests were carried out with solvent-phase epoxy primers.

Illustration 1: Tests of the Preparation in a Solvent-Phase Vinyl Alkyd Primer

The formula of table 12 was prepared.

TABLE 12

Formula of a solvent-phase vinyl alkyd primer

| STARTING MATERIALS | % WEIGHT | DESCRIPTION | SUPPLIERS |
|---|---|---|---|
| SETAL 199-SS-55 | 25.5 | Medium oil alkyd | NUPLEX |
| ACETONE | 5.00 | solvent | SHELL |
| NUODEX 10% Ca | 0.50 | Dispersant | ELEMENTIS Specialities |
| BENTONE SD2 | 0.30 | Rheological additive | NL Chemicals |
| SOLVESSO 100 | 7.5 | Aromatic solvent | EXXON CHEMICAL |
| ZINC PHOSPHATE PZ20 | 8.00 | Corrosion inhibitor | SNCZ |
| TALC 10 M2 | 4.00 | filler | RIO TINTO Minerals |
| MICA MU M 2/1 | 9.00 | filler | CMMP |
| MICRONOX | 11.00 | Micronized natural iron oxide | KEYSER AND MACKAY |
| THIXATROL ST grinding for 40 minutes until Hegman fineness of 6 is obtained | 0.30 | Thixotropic additive | NL Chemicals |
| LAROFLEX MP35/S100 at 28.5% | 21.10 | Vinyl chloride copolymer | BASF |
| SOLVESSO 100 | 2.93 | Aromatic solvent | EXXON CHEMICAL |
| ISOPROPYL ALCOHOL | 1.20 | solvent | SHELL |
| CERECLOR 42 | 0.60 | Chloroparaffin, plasticizer | INEOS |
| NUODEX 8% Co | 0.05 | siccative | ELEMENTIS Specialities |
| NUODEX 10% Zr | 0.12 | siccative | ELEMENTIS Specialities |
| DUOMEEN TDO | 0.30 | Cationic surfactant | AKZO Chemie |
| MEKO | 0.50 | Methyl ethyl ketoxime, anti-skinning agent | |
| % PVC (pigment volume concentration) | 30.21 | | |
| Dry extract, % by weight | 60.49 | | |
| Dry extract, % by volume | 41.62 | | |
| Pigment/binder ratio (by volume) | 0.43 | | |

Comparison of the Compounds PZ, PZATB, and PZAT90 in Alkyd Primer

PZ, the preparation PZ 80%/PAT30 10%/ZnO 10%, and the preparation PZ 90%/PAT30 10% were compared. PZATB and PZAT90 were prepared by physical mixing.

A metal surface was given a coat of anti-corrosion primer incorporating the pigment compounds in an alkyd resin, having a thickness of 40 μm. This coat is covered with a film of an alkyd coat having a thickness of 25 μm, also commonly called topcoat.

The whole is exposed to a salt fog (standard ASTM B117) for 300 hours.

FIG. 1 illustrates the results obtained.

A rating made it possible to evaluate the degree of rusting and the degree of blistering.

For the degree of rusting, standard NF ISO 4628-3 T30-140-3 was used.

Ri0: no rusting, 0% rusted surface area
Ri1: very little rusting, 0.5% rusted surface area
Ri5: highly rusted, 40 to 50% rusted surface area For the degree of blistering, standards NF ISO 4628-1 T30-140-2 and NF ISO 4628-3 T30-140-2 were used.

DOS0: no detectable defect of size invisible at 10× magnification
D2S2: small amount of small blisters
D5S5: large amount of large blisters.

The "scribe rating" and the "global rating" are produced according to standard ASTM D 1654 January 2005—"Standard Test Method for Evaluation of Painted or Coated Specimens Subjected to Corrosive Environments"—tables 1 and 2 respectively, page 3.

Rating at Scribe:
10 represents 0 mm at scribe
0 represents 16 mm and more at scribe
Global Rating:
10 represents 0% degradation
0 represents more than 75% degradation.

The rating in table 13 is produced according to the standards described above.

TABLE 13

Rating of the solvent-phase vinyl alkyd primer

| | Degree of rusting NF-ISO 4828-3 T 30140-3 | Degree of blistering NF-ISO 4828-3 T 30140-3 | Scribe corrosion ASTM 1654 | Full plate global rating ASTM 1654 |
|---|---|---|---|---|
| PZ | RI1 | D2S2 | 6 | 6 |
| PZAT90 | RI1 | D3S2 | 4 | 4 |
| PZATB | RI0 | D0S0 | 8 | 9 |

PZATB is as effective as PZ, and more effective than PZAT90.

Illustration 2: Tests of the preparation in a solvent-phase epoxy amide primer

The formula of table 14 was prepared.

TABLE 14

Formula of a solvent-phase epoxy amide

| STARTING MATERIALS | % WEIGHT | DESCRIPTION | SUPPLIERS |
|---|---|---|---|
| PART A | | | |
| Introduce with mixing in the following order | | | |
| EPIKOTE 1001/XYLENE 50/50 weight/weight | 22.90 | Epoxy resin | HEXION |
| SOLVESSO 100 | 7.20 | Aromatic hydrocarbon solvent | TOTAL Chimie |
| ISOBUTYL ALCOHOL | 1.60 | Solvent | SHELL |
| DOWANOL PMA | 7.30 | Glycol ester, solvent | DOW |
| NUODEX 10% Ca | 0.50 | Dispersant | ELEMENTIS Specialities |
| BENTONE SD2 | 0.15 | Rheological additive | ELEMENTIS Specialities |
| $TiO_2$ TR92 | 4.30 | Rutile | HUNSTMANN |
| ZINC PHOSPHATE PZ20 | 8.00 | Corrosion inhibitor | SNCZ |
| YELLOW IRON OXIDE 3920 | 5.10 | Pigment, colorant | BAYER |
| TALC 10 M2 | 9.30 | Filler | RIO TINTO Minerals |
| MICA MU 2/1 | 10.70 | Filler | CMMP |
| THIXATROL ST | 0.20 | Thixotropic additive | ELEMENTIS Specialities |
| Grinding in ball mill for 40 minutes until Hegman fineness of 5 obtained | | | |
| BUTYL ACETATE | 2.50 | Ester, solvent | TOTAL chimie |
| CERECLOR M50 | 2.40 | Chloroparaffin, plasticizer | INEOS |
| DUOMEEN TDO | 0.15 | Cationic surfactant | AKZO Chemie |
| PART B | | | |
| XYLENE | 3.00 | Aromatic hydrocarbon, solvent | TOTAL Chimie |
| EPILINK 230 | 0.30 | Accelerator | AKZO Chemie |
| ARADUR 115 X70 BD | 14.40 | Polyamidoamide hardener | VANTICO |
| % PVC (pigment volume concentration) | 34.5 | | |
| Dry extract, % by weight | 62.39 | | |
| Dry extract, % by volume | 44.75 | | |
| Pigment/binder ratio (by volume) | 0.53 | | |

Comparison of the compounds PZ, PZATB and PZAT90 in epoxy amide primer

PZ, the preparation PZ 80%/PAT30 10%/ZnO 10%, and the preparation PZ 90%/PAT30 10% were compared. PZATB and PZAT90 were prepared by physical mixing.

A metal surface was given a coat of anti-corrosion primer incorporating the pigment compounds in an epoxy amide resin, having a thickness of 50 µm. This coat is covered with a film of polyurethane PU having a thickness of 100 µm, also commonly called topcoat.

The whole is exposed to a salt fog (standard ASTM B117) for 600 hours.

Figure 2:
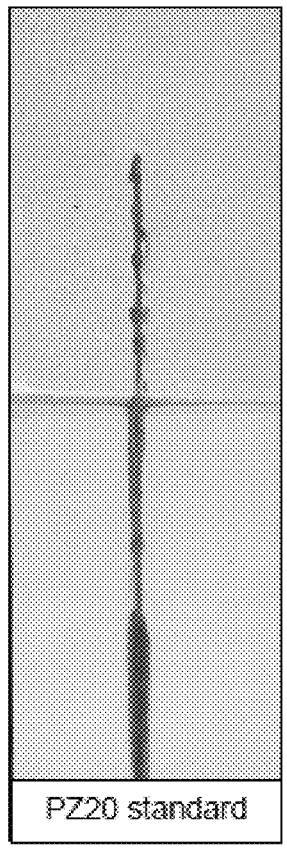
FIG. 2 illustrates paint tests for evaluating the anti-corrosion performance levels, carried out according to the ASTM 1654 standards for plate blistering and degree of rusting, of a coating comprising an anti-corrosion adhesion primer of a first type of epoxy amine incorporating a standard zinc phosphate, of a coating comprising an anti-corrosion adhesion primer of a first type of epoxy amine incorporating a first compound of the invention, and of a coating comprising an anti-corrosion adhesion primer of a first type of epoxy amine incorporating a second compound according to the invention.
Figure 2:

FIG. 2 illustrates the results obtained.

The rating in table 15 is produced according to the same standards as mentioned above.

TABLE 15

Rating of the solvent-phase epoxy amide primer

| | Degree of rusting NF-ISO 4828-3 T 30140-3 | Degree of blistering NF-ISO 4828-3 T 30140-3 | Scribe corrosion ASTM* 1654 | Full plate global rating ASTM* 1654 |
|---|---|---|---|---|
| PZ | RI1 | D2S2 | 4 | 7 |
| PZAT90 | RI1 | D2S2 | 6 | 8 |
| PZATB | RI1 | D2S2 | 3 | 6 |

PZAT90 is as effective as PZ, and more effective than PZATB.

Illustration 3: Tests of the Preparation in a Solvent-Phase Epoxy Amine Primer

The formula in table 16 was prepared.

TABLE 16

Formula of a solvent-phase epoxy amine primer

| STARTING MATERIALS | % WEIGHT | DESCRIPTION | SUPPLIERS |
|---|---|---|---|
| PART A | | | |
| Introduce with stirring in the following order | | | |
| EPIKOTE 1001/XYLENE 50/50 weight/weight | 25.40 | Epoxy resin | HEXION |
| SOLVESSO 100 | 7.90 | Aromatic hydrocarbon, solvent | TOTAL chimie |
| ISOBUTYL ALCOHOL | 1.80 | Solvent | SHELL |
| DOWANOL PMA | 8.00 | Glycol ester, solvent | DOW |
| NUODEX 10% Ca | 0.50 | Dispersant | ELEMENTIS Specialities |
| BENTONE SD2 | 0.20 | Rheological additive | ELEMENTIS Specialities |
| TiO$_2$ TR92 | 4.80 | Rutile | HUNSTMANN |
| ZINC PHOSPHATE PZ20 | 8.00 | Corrosion inhibitor | SNCZ |
| YELLOW IRON OXIDE 3920 | 5.70 | Pigment, colorant | BAYER |
| TALC 10 M2 | 9.00 | Filler | RIO TINTO Minerals |
| MICA MU 2/1 | 10.00 | Filler | CMMP |
| THIXATROL ST | 0.20 | Thixotropic additive | ELEMENTIS Specialities |
| Grinding in bead mill for 40 minutes until Hegman fineness of 5 obtained | | | |
| BUTYL ACETATE | 2.60 | Ester, solvent | TOTAL chimie |
| CERECLOR M50 | 2.60 | Chloroparaffin, plasticizer | INEOS |
| DUOMEEN TDO | 0.20 | Cationic surfactant | AKZO Chemie |
| PART B | | | |
| XYLENE | 4.10 | Aromatic hydrocarbon, solvent | TOTAL chimie |
| DOWANOL PMA | 4.10 | Glycol ester, solvent | DOW |
| EFFIDUR 433 | 4.90 | Cycloaliphatic polyamine | France INDUSTRIE |
| % PVC (pigment volume concentration) | 39.27 | | |
| Dry extract, % by weight | 58.56 | | |
| Dry extract, % by volume | 39.27 | | |
| Pigment/binder ratio (by volume) | 0.65 | | |

Comparison of the Compounds PZ, PZATB and PZAT90 in Epoxy Amine Primer

An anti-corrosion primer based on epoxy amine incorporating the pigment preparations is prepared, having a thickness of 50 μm. This coat is covered with a film of polyurethane PU having a thickness of 100 μm, also commonly called topcoat.

The whole is exposed to a salt fog—standard ASTM B117—for 600 hours.

FIG. 3 illustrates the results obtained.

The rating in table 17 is produced according to the same standards as mentioned above.

TABLE 17

Rating of the solvent-phase epoxy amine primer

| | Degree of rusting NF-ISO 4828-3 T 30140-3 | Degree of blistering NF-ISO 4828-3 T 30140-3 | Scribe corrosion ASTM* 1654 | Complete plate general rating ASTM* 1654 |
|---|---|---|---|---|
| PZ | RI1 | D0S0 | 6 | 6 |
| PZAT90 | RI0 | D0S0 | 8 | 9 |
| PZATB | RI1 | D0S0 | 6 | 6 |

PZATB is as effective as PZ, PZAT90 is more effective than these other two compounds.

A comparison of PZ and of the PZAT90 pigment in an epoxy amide system, and solvent-phase epoxy amide shows very satisfactory results regarding the performance of the PZAT90 pigment.

The invention claimed is:

1. A detoxification method for obtaining a pigment compound free from acute and chronic aquatic ecotoxicity, the method consisting of mixing at least one zinc-based component with good anti-corrosive properties but high toxicity, selected from the group consisting of: zinc metal powder, zinc oxide, zinc hydroxide, zinc phosphate, zinc borate, zinc stearate, zinc laurate, zinc carbonate, zinc hydroxycarbonate, zinc polyphosphate, zinc phosphite, zinc pyrophosphate, zinc phosphonate, zinc silicate, and zinc ferrite, wherein the pigment compound includes a ratio of approximately 90%/10% weight of the zinc-based component to MgHPO$_4$.3H$_2$O or Mg$_3$(PO$_4$)$_2$.5H$_2$O and wherein the mixing is carried out with zinc phosphate Zn$_3$(PO$_4$)$_2$.0 to 4H$_2$O and zinc oxide, and magnesium phosphate MgHPO$_4$.3H$_2$O, the weight ratio between the zinc-based components and the magnesium phosphate being nonzero and less than 99.5%.

2. The detoxification method according to claim 1, wherein said pigment component free from toxicity has an algae inhibition rate of less than 50% according to Organisation for Economic Cooperation and Development (OECD) protocol 201, a *daphnia* immobilization rate of less than 50% according to OECD protocol 202, a fish mortality rate of less than 50% according to OECD protocol 203, which results in a median lethal concentration LC50s and a half maximal effective concentration EC50s of greater than 100 mg/l, an No Observed Effect Concentration (NOEC) of strictly greater than 1 mg/l on *daphnia* reproduction according to OECD protocol 211.

3. A detoxification method for obtaining a pigment compound free from acute and chronic aquatic ecotoxicity, the method consisting essentially of mixing at least one zinc-based component with good anti-corrosive properties but high toxicity, selected from the group consisting of: zinc metal powder, zinc oxide, zinc hydroxide, zinc phosphate, zinc borate, zinc stearate, zinc laurate, zinc carbonate, zinc hydroxycarbonate, zinc polyphosphate, zinc phosphite, zinc pyrophosphate, zinc phosphonate, zinc silicate, and zinc ferrite, wherein the pigment compound includes a ratio of approximately 90%/10% weight of the zinc-based component to $MgHPO_4.3H_2O$ or $Mg_3(PO_4)_2.5H_2O$, wherein the mixing is carried out with zinc oxide, zinc phosphate $Zn_3(PO_4)_2.0$ to $4H_2O$ and magnesium phosphate $MgHPO_4.3H_2O$, the weight ratio between the zinc-based component and the magnesium phosphate being non-zero and less than 99.5% and, wherein the weight ratio between the zinc phosphate and the magnesium phosphate is approximately 90%/10%, and the weight ratio between the zinc phosphate, the magnesium phosphate and the zinc oxide is approximately 80%/10%/10%.

4. A detoxification method for obtaining a pigment compound free from acute and chronic aquatic ecotoxicity, the method consisting of mixing at least one zinc-based component with good anti-corrosive properties but high toxicity, selected from the group consisting of: zinc metal powder, zinc oxide, zinc hydroxide, zinc phosphate, zinc borate, zinc stearate, zinc laurate, zinc carbonate, zinc hydroxy carbonate, zinc polyphosphate, zinc phosphite, zinc pyrophosphate, zinc phosphonate, zinc silicate, and zinc ferrite, wherein the pigment compound includes a ratio of approximately 90%/10% weight of the zinc-based component to $MgHPO_4.3H_2O$ or $Mg_3(PO_4)_2.5H_2O$ and wherein the mixing is carried out with zinc phosphate $Zn_3(PO_4)_2.0$ to $4H_2O$ and zinc oxide, and magnesium phosphate $MgHPO_4.3H_2O$, the weight ratio between the zinc-based components and the magnesium phosphate being nonzero and less than 99.5%, wherein the pigment compound is mixed as a powder via a physical or chemical process, the chemical process being selected from the group consisting of a sequential precipitation, a sequential crystallization, a coprecipitation, and a cocrystallization, the physical process being selected from the group consisting of grinding, kneading, dispersion, extrusion, forming a slurry, and granulation.

* * * * *